Sept. 3, 1963

R. J. HOSKINS ETAL 3,102,781

CENTRIFUGAL PROCESSING APPARATUS FOR DESTROYING INSECT INFESTATION

Filed Sept. 30, 1960

INVENTORS.
ROBERT J. HOSKINS
ARNOLD J. TENNER

BY Nelson E. Kimmelman
ATTORNEY

3,102,781
CENTRIFUGAL PROCESSING APPARATUS FOR DESTROYING INSECT INFESTATION
Robert J. Hoskins, Strafford, Wayne, Pa., and Arnold J. Tenner, West Haven, Conn., assignors to Entoleter, Inc., Hamden, Conn., a corporation of Delaware
Filed Sept. 30, 1960, Ser. No. 59,646
9 Claims. (Cl. 21—61)

This invention relates to centrifugal impact milling apparatus and especially to an improved rotor for the same.

Centrifugal impact milling machines such as the one described in U.S. Patent No. 2,644,740, issued to R. B. Dodds et al. on July 7, 1953, are well known and have been used for a number of years in diverse fields such as particle size reduction and grain infestation destruction. In the latter application, for example, grain or grain products such as flour which may contain live insects is applied to the working area of a high speed rotor situated in a closed chamber or casing. In one form the rotor is connected at the bottom of a vertical shaft and rotates substantially in a horizontal plane. The rotor may consist of a solid circular bottom plate and an annular top plate which is supported on the bottom plate by a plurality of upstanding "impactors" disposed between the plates near the periphery thereof. The flour is fed to the bottom plate via an inlet in the casing which is coupled to a space between the inner edge of the annular top plate and the rotor shaft. A circular vertical wall or collar, sometimes known as the "distributor," depends from the lower surface of the top of the rotor casing to assist in preventing the flour from escaping from the processing action of the rotor.

The speed of the rotor's rotation is such that the flour is impelled outwardly from the inlet area, between the rotor plates, into contact with the moving impactors at a velocity sufficient to kill the insects and/or to reduce the size of the flour particles. If desired a ring of stationary impactors may be placed surrounding the moving impactors.

In a typical machine of the class described, such as the "Entoleter" brand Series 27 centrifugal machine, the rotor is affixed to a spinning shaft which may be rotated, for example, at speeds in the range 1600 r.p.m.–4200 r.p.m. At speeds in the lower part of this range, it is relatively easy to lubricate satisfactorily the spinning shaft by conventional means, but if the same machine is to be used at speeds toward the higher end of the range, the effectiveness of the lubrication is considerably diminished unless the tolerances of the various rotating parts such as the rotor shaft and the bearing assemblies (which support the rotor shaft) are purposely made large enough. Larger clearances permit the bearing races to expand should higher heat levels be generated without pinching the balls in the bearings. However, because of these larger tolerances there will be a certain amount of off-axis movement of the rotor shaft sometimes known as "run-out." To account for this, the inner edge of the annular top plate of the rotor is spaced from the aforesaid adjacent depending wall by about $\frac{1}{16}$ of an inch. The alternative to providing this clearance is to machine the component parts of the machine to smaller tolerances, but this not only greatly increases the cost of manufacture but also gives rise to the lubrication problem previously mentioned.

In the actual operation of this machine, especially when the infested material to be milled was to be applied thereto at a rapid rate, it was noted that the milled product often contained an undesirably high number of live insects or insect life which had somehow managed to escape collision with the impactors. In an effort to remedy this situation, a number of approaches were tried which were unsuccessful and it was not until the present inventors tracked down the source of the trouble and devised a novel way of combatting it that the problem was solved.

Accordingly, a primary object of the present invention is to provide an improved centrifugal impact milling machine exhibiting greatly improved performance when used as an infestation destroyer.

Another object of the invention is to provide an improved centrifugal impact milling machine capable of killing substantially all insects in granular type food products which are to be applied to the said machine at a high feed rate.

Still another object of the invention is to provide an improved centrifugal impact milling machine in which live insects in granular materials are not able to by-pass the lethal processing area of the rotor.

Yet another object of the invention is to provide a relatively inexpensive rotary impact milling machine capable of operation efficiently at a wide range of speeds having excellent insect destroying capabilities which are maintained substantially constant throughout said range.

Still other objects of the invention may be appreciated from a perusal of the drawings, specification, and claims herein.

We found after extensive tests, that the reason the impact-milled material contained more insects when apparatus of the type described was used, especially at higher speeds, was that the insects either were blown or crawled through the clearance between the depending collar and the inner edge of the top annular rotor plate and would therefore avoid the effect of the impactors. To prevent the escape of the insects we considered a number of possible alternative measures until we found that the best way to prevent their escape was to provide means for producing a downdraft of air in the clearance to oppose upward movement of the insects and prevent insects from by-passing the impacting area.

Figure 1:
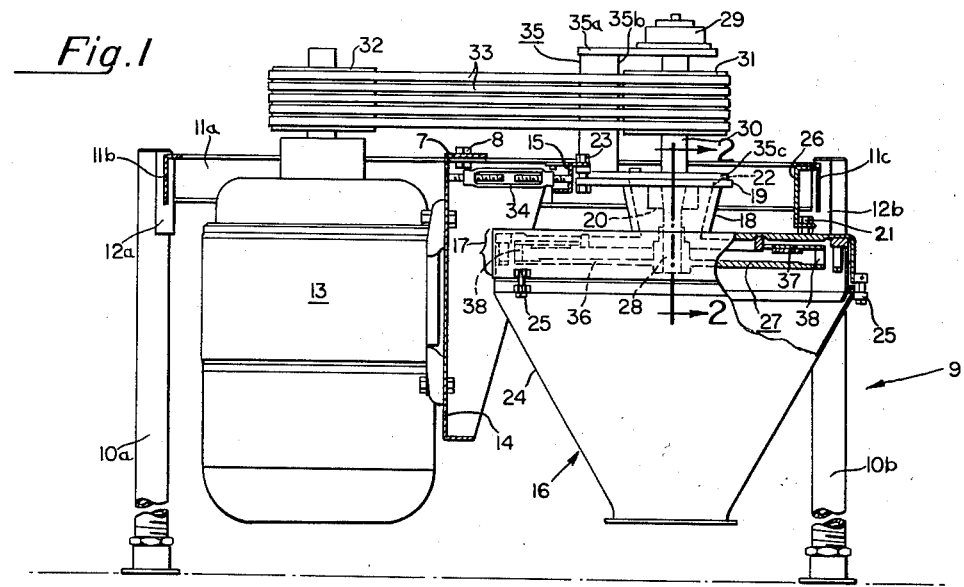
FIGURE 1 is a side elevation view of a typical centrifugal impacting machine, partly sectional, which illustrates one form of our invention.

Referring first to FIGURE 1, a typical general environment for our invention will first be set forth to clarify the relation of the invention thereto. It should be borne in mind, however, that the invention is equally useful in structures of the same general class other than the particular one shown in the figures herein.

A supporting generally rectangular frame 9 is provided which includes four vertical cylindrical posts 10 (two of which, namely 10a and 10b are shown) to which four horizontal beams are connected, two of these beams running lengthwise of the structure and two running transverse thereto. One of the lengthwise beams is a beam 11a which is shown in full. Two crossbeams 11b and 11c are shown in section; the fourth lengthwise beam is not shown for simplicity of illustration. These beams are fixedly connected as by welding (or bolting) to four curved plates or sockets 12 (two of which, 12a and 12b, are pictured) which are curved to match the contour of the surfaces of the vertical columns 10a and 10b. The sockets are permanently affixed to the vertical columns by welding (or bolting) for example, as desired.

A heavy-duty motor 13 is bolted, as shown, to a vertical motor support member 14 having a horizontal portion 7 which rests on the longitudinal beams. Either the portion 7 or the longitudinal beams (or both) may have slots running lengthwise of the frame. A bolt assembly 8 extends through the slot in the portion 7 or in the beam to anchor the slides in the desired horizontal position once adjustment of the spacing of the motor 13 from the rotary processing part of the apparatus has been made by means of the turnbuckle 34.

In order to support the rotary processing equipment there is also provided a spanning transverse Z-beam 15 connected at its ends, as by welding, to the two longitudinal beams 11. A rotor casing or chamber indicated generally at 16 depends from the supporting structure 9 by connections to the transverse spanning beam 15 and to the member 11c as will be explained in detail below. The rotor casing 16 includes a top casing member 17 which is essentially cylindrical in shape. Connected to, and extending upwardly and outwardly from the top 17 are two input chutes one of which, designated by the number 18 (see also FIG. 2), is on the side of the pulley shaft 30 toward the reader. There is an identical chute (not shown) on the other side of shaft 30. At the tops of, and connecting these two chutes is a horizontal rectangular plate section 19 integral with the chutes 18 which extends transversely of the longitudinal beam 11. Plate section 19 has a central round-apertured portion 43 through which the shaft 30 passes and two rectangular openings 22 for the chutes on either side thereof. To the plate section 19 a flanged input conduit (not shown) may be connected, for example, for supplying the material to be milled.

The plate 19 has apertures through which bolt 23, on the side of the shaft 30 toward the reader, and another bolt (not shown) on the other side of the shaft, are passed to suspend the top 17 of the casing 16 from the Z-beam 15. The casing top 17 is also suspended from the transverse beam 11c by a bolt connection 21 to a C-beam 26 whose upper surface is fixedly connected, as by welding, to the cross beam 11c.

The rotor casing 16 also includes a lower hopper portion 24 which is secured to the upper portion 17 by clamps 25 connected to the top and bottom members 17 and 24 at various points around the junction of the lower edge of the top portion 17 and the upper rim of the lower portion 24. These clamps 25 permit the casing 16 to be disassembled to allow access to the rotor 27, for example, or to permit the hopper 24 to be cleaned.

Figure 2:
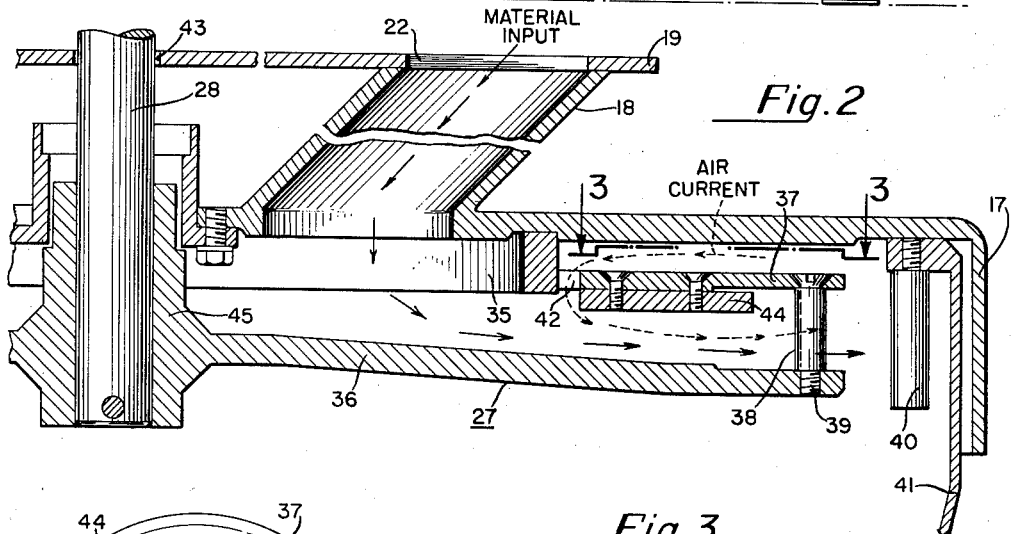
FIGURE 2 is an enlarged fragmentary and sectional view of the rotor and its environment taken along the line 2—2 shown in FIG. 1.

Referring now principally to FIGS. 1 and 2, a rotor 27 is located within the general confines of the top casing portion 17. Rotor 27 is keyed or otherwise attached to the lower shaft portion 28 which is a continuation of the upper shaft portion 30. The upper shaft portion 30 is mounted in a spindle assembly or yoke 35 consisting of two planar horizontal members 35a and 35c connected by an intermediate vertical member 35b. Between the members 35a and 35c and mounted fixedly on the upper shaft portion 30 is a pulley sheave 31. The member 35c may be bolted or otherwise fixedly connected to the midsection of the plate section 19. The top end of shaft portion 30 is journalled in a top bearing assembly 29 and its lower end passes through lower bearing assembly 20.

Opposite the sheave 31 and parallel thereto is a sheave 32 fixedly mounted on the rotor shaft of the motor 13. Around both sheaves are disposed a plurality of belts 33 for transmitting energy from the motor 13 to the rotor 27. As previously mentioned, the horizontal spacing between the sheaves 31 and 32 and consequently the tension on belts 33 can be adjusted by turning the turnbuckle 34 connected to the plate 14 and to the spanning Z-beam 15.

Figure 4:
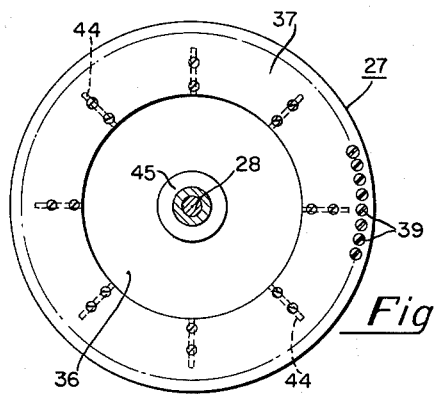
FIGURE 4 is a plan view of the rotor shown in FIGURES 1, 2 and 3.

As seen in the enlarged view of FIG. 2 the rotor 27 consists of an essentially disc-like bottom plate 36 fixedly connected to the hub 45 which is mounted fixedly around the lower shaft portion 28. The rotor 27 also includes an annular upper plate 37 which is supported on the lower plate 36 by a series of movable vertical impactors 38. Impactors 38, which may be hollow cylindrical steel members, are fixed in place between upper and lower plates 37 and 36, by bolts 39 passing through their bore which thread into apertures in the lower plate 36. The movable impactors 38 are disposed in a circular row near the outer edges of plates 36 and 37 (FIG. 4). In some models stationary impactors 40 are arranged in a concentric row surrounding the row of movable impactors 38. Impactors 40 are fixedly (and preferably demountably) connected, as by bolts passing through them, which thread into holes in a liner 41 mounted near the peripheral vertical wall of the top casing member 17.

When the motor 13 is in operation the rotor 27 rotates at desired speeds from 1,600–3,850 r.p.m. Material to be milled is fed via the input chute 18 (and its counterpart on the other side of the shaft 30) to the upper surface of the bottom rotor plate 36 near the hub 45. The input area is substantially segregated from the area where the impact-break action occurs by a circular vertical collar (distributor) or wall member 35 which depends from the horizontal interior surface of the top 17 or which may actually be formed as part of the lower surface of top 17. This member 35 prevents the greater part of the incoming particulate material from moving upward and over the top plate 37 into the hopper 24.

As may be seen by reference to FIGURE 2, the solid arrows indicate the direction of flow of the input material. As the rotor 27 spins, the applied material is hurled by the generated centrifugal force outward until it strikes the row of impactors 38 with force sufficient to kill any insect life within the material. In the case of flour, an insect known as the "confused flour beetle" often is an infestant but when the flour hits the impactors 38 the insects are destroyed. The flour impacted by the impactors 38 also strikes the outer row of impactors 40 which doubly insure that all insects passing through the processing area are destroyed and may also contribute to reduction of the flour particle size if desired.

Since the bearings and the other mountings of the rotor 27 have finite tolerances and since the rotor may spin as high as 4,200 r.p.m., the components of the rotary motion may cause the axis of revolution of the rotor shaft 30 to wander sideways a bit. Consequently there is provided an annular space 42 of about $\frac{1}{16}$" between the collar 35 and the inner edge of the top plate 37.

It was found that when the material to be applied is fed via the chutes 18 at a high rate, as for example at 40,000 or 50,000 pounds per hour, an undesirably high number of live insects were found mixed in with the processed flour in the hopper 24. It was first thought that the insects were able to get through the spaces between adjacent ones of the impactors 38. Various expedients were at first resorted to in order to overcome what was believed to be the problem. For example, a horizontal disc-shaped plate was fixed to the edge of the collar and the top rotor plate was dispensed with. The outer edge of the additional plate was made to come very close to the rotating impactors which now were fixed only to the lower rotor plate. This approach not only did not improve the situation it worsened it. After this attempt, three rows of impactors were tried but this also was unsuccessful. Impactors having shapes other than cylindrical were then tried, again without avail. Finally, the present inventors realized that it was not a question of insect life getting through the moving impactors unscathed, but rather a case of the insect life being able to bypass the impacting area by going or being borne by air currents through the space 42, over the top rotor plate 37 and finally into the hopper 24.

Figure 3:
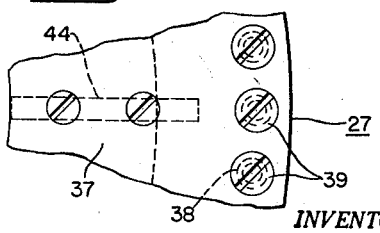
FIGURE 3 is a fragmentary plan view of part of the rotor shown in FIGURE 2 looking in the direction of the arrows associated with the line 3—3 of FIG. 2.

Various alternative ways of correcting this trouble were considered but the one finally adopted was found to be the most satisfactory from the standpoint of simplicity, cost and effectiveness. This consisted of providing means associated with the rotation of the rotor 27 to generate a current of air in the space 42 in such a direction that insect life would not be able to move upwards and through it. Accordingly, as shown in FIGURES 2, 3 and 4, eight solid bars 44 were mounted on the under-side of the top rotor annulus 37. The bars 44 were spaced equal distances from one another and arranged radially with respect to the hub 45. When the rotor 27 moved, the bars 44 caused an air current, as shown by the broken-line arrows in FIG. 2, to move down through the space 42 and thence out toward and through the impacting region. At a rate of input of 45,000 lbs./hour, with the rotor spinning at 2,240 r.p.m. and with 84 stationary impactors, it was found on repeated tests that all of the insect life present in the flour was destroyed.

While the utility of the present invention has been explained in terms of very small insects being borne through the space 42, it should be appreciated that there is always the possibility that insect eggs or larvae as well as adult insects may pass through the space. Thus, while theoretically it might be possible to design the spindle and other machine parts so that the space 42 can be smaller than the size of adult insects, which design would make the cost of the machine very high, to make the space 42 so small that insect eggs themselves could not pass through would undoubtedly make the cost prohibitive. Furthermore, it is not absolutely certain that refining the tolerances to this degree would be entirely effective or practical. While our invention as explained above, however, the tolerance limitations of the various components of the machine and of the space 42 may be considerably relaxed to allow for "run-out" with no reduction of the machine's insect-destroying capabilities and with a resultant savings in cost. Besides, as stated previously, at higher speeds the effectiveness of the lubrication of the rotor parts is enhanced when the tolerances are greater.

It should also be remembered that although the invention has been explained in connection with one particular type of centrifugal impact-milling machine, it is just as applicable to other types having rotating impacting elements of different shapes and sizes, or different numbers of impactors, or different numbers and kinds of stationary impactors. For example, the invention might be used with an impact milling machine of the type shown in U.S. Patent 2,529,679, issued to R. B. Dodds on November 14, 1950.

In the illustrated embodiment of the invention it was assumed that air was the ambient atmosphere within the rotor housing. In most cases this is the atmosphere, but sometimes the atmosphere may be a gas or vapor phase and the invention will be equally applicable in such cases.

Still other applications and modifications of our invention may be made without in any way departing from the essence thereof.

We claim:

1. In centrifugal processing apparatus for destroying insect infestation in particulate materials, said apparatus including a rotor housed in a casing which is constructed to permit the passage through it of said materials for application to said rotor which thereupon impels said materials by centrifugal force to insect-destroying elements located toward the periphery of said rotor, said housing including a wall member between said elements and the area of said rotor to which said materials are applied, said wall member being separated from said rotor by a predetermined space having dimensions such that insect life in said applied material is able to pass through it and thereby avoid lethal contact with said insect-destroying elements, the improvement which comprises: means for producing in said space a current of the ambient atmosphere in a direction such as to prevent said insect life from escaping lethal contact with said insect-destroying elements.

2. In centrifugal processing apparatus for destroying insect infestation in particulate materials, said apparatus including a rotor housed in a casing which includes at least one inlet through the top thereof, said inlet being positioned to conduct said materials to the central portion of the said rotor, said rotor having a plurality of insect-destroying elements positioned in its peripheral region, means connected to said casing between said inlet area and said peripheral region which cooperates in conducting said materials from said inlet to said central rotor portion, said confining means being separated from the region where said insect-destroying elements are located by a predetermined space which is large enough to permit the passage of insect life through it thereby to avoid lethal contact with said insect-destroying elements, means for preventing the passage through said space of said insect life comprising: means fixed to said rotor in said peripheral region for producing an air current in said space which prevents insect life from passing through said space.

3. The invention according to claim 2 wherein said means fixed to said rotor comprises a plurality of radially disposed members which create a downward air current in said space upon rotation of said rotor.

4. In centrifugal processing apparatus for destroying insect infestation in particulate materials, said apparatus including a casing for a rotor, a rotor which has a central portion and a peripheral portion, said casing including an inlet through the top thereof to permit said materials to be applied to said central rotor portion, said rotor peripheral portion having a plurality of insect-destroying impactors located therein, means affixed to said top of said rotor casing for confining said materials applied from said inlet to said central rotor portion, said confining means being separated from said top rotor portion by a predetermined space which is large enough to permit the passage of insect life through it thereby to avoid lethal contact with said impactors, means for preventing the passage through said space of said insect life comprising: a plurality of radially disposed solid members fixed to the underside of said top rotor plate for creating, in response to the rotation of said rotor, a downward air current in said space for preventing insect life from passing through said space and for assisting in impelling said material toward said impactors.

5. In centrifugal processing apparatus for destroying insect infestation in particulate materials, said apparatus including a casing, a rotor mounted through the top of said casing, said rotor including a lower substantially disc-shaped member, an upper annular member substantially parallel thereto, and a plurality of impacting elements fixed between said members near the outer edges thereof, inlet means formed in said casing top near the central region of said rotor for permitting the passage through it of said materials to said central region, circular wall means in said casing and fixed to the underside of the top thereof between said inlet means and the inner edge of said annular means said wall means being constructed to confine said applied materials to the central portion of said rotor and to prevent said applied material from passing over said annular means, said wall means being separated from the inner edge of said annular means by a predetermined space, said space having dimensions such that insect life in said applied material is able to pass through it thereby to escape lethal contact with said impacting elements, the improvement which comprises: a plurality of elongated members radially disposed on the underside of said annular means and fixedly connected thereto for producing, in response to the rotation of said rotor, a downward air current in said space which prevents insect life in said materials from passing through said space.

6. In centrifugal impact-milling apparatus for destroying insect infestation in granular foodstuffs, said apparatus including a rotor having a shaft, a substantially disc-shaped horizontal lower plate and a substantially annular horizontal upper plate substantially parallel thereto, said upper plate being connected to and being supported on said lower plate by a plurality of vertical impactors fixedly arranged between said upper and lower plates near the peripheries thereof, a casing for said rotor through which said rotor shaft is mounted, said casing including an input passageway in its upper portion for permitting the application of said granular foodstuffs to the central region of the top surface of said lower plate, a substantially circular vertical wall depending from the underside of said upper portion of said casing, said wall being separated from the inner edge of said annular upper rotor plate by a predetermined circular space, said wall being disposed between said input passageway and said inner edge for confining the application of said granular foodstuffs to said central region, said space being sufficiently large to permit insect life to pass through it and above said top rotor plate thereby to avoid destruction by said impactors, the improvement which comprises: a plurality of bars fixedly mounted on the underside of said top rotor plate near said predetermined space, said bars being disposed radially under said top plate at substantially equal distances from one another and substantially perpendicular to points on said inner edge in line with other respective axes, said bars producing an air current in a downward direction through said space upon rotation of said rotor which prevents said insects from passing through said space and over said annular plate thereby avoiding lethal contact with said impactors.

7. A rotor for centrifugal processing apparatus for destroying insect infestation in particulate materials, said rotor comprising: two essentially parallel planar members spaced from one another by a plurality of insect-destroying elements disposed fixedly between said members near the outer periphery thereof, and a plurality of means fixed to at least one of said members for producing, upon rotation of said rotor, a current of air through said planar members toward and between said insect-destroying elements.

8. The rotor according to claim 7 wherein said planar members are substantially round and wherein said plurality of means for producing an air current includes elongated members radially disposed on the inner surface of one of said round members.

9. A rotor for centrifugal processing apparatus for destroying insect infestation in particulate materials, said rotor comprising a first generally annular member and a second round member spaced from one another by a plurality of insect-destroying elements disposed fixedly between said members near the outer periphery thereof, and a plurality of means fixed to the inner surface of said annular member for producing, upon rotation of said rotor, a current of air through said first and second members toward and between said insect destroying elements.

References Cited in the file of this patent
UNITED STATES PATENTS

| | | |
|---|---|---|
| 2,591,141 | Dulait | Apr. 1, 1952 |
| 2,656,988 | Smith | Oct. 27, 1953 |
| 2,867,387 | Dodds et al. | Jan. 6, 1959 |
| 2,882,149 | Willems | Apr. 14, 1959 |
| 3,023,973 | Conley et al. | Mar. 6, 1962 |